Patented Oct. 8, 1940

2,216,761

UNITED STATES PATENT OFFICE 2,216,761

MANUFACTURE OF COLORING MATTERS

Max Wyler, Blackley, Manchester, England, assignor to Imperial Chemical Industries Limited, a corporation of Great Britain No Drawing. Original application May 27, 1936, Serial No. 82,147. Divided and this application November 4, 1938, Serial No. 238,810. In Great Britain June 4, 1935

7 Claims. (Cl. 260—314)

This application is a division of my copending application, Serial No. 82,147, filed May 27, 1936.

This invention relates to the manufacture of coloring matters of the phthalocyanine series. More particularly this invention deals with the manufacture of copper phthalocyanines.

It is an object of this invention to provide an efficient and economical process for producing copper phthalocyanines. Other and further objects of this invention will appear as the description proceeds.

In British Patents Nos. 322,169, 369,842 and 410,814, there are described a series of coloring matters obtainable for instance by reacting phthalonitrile and copper or copper compounds; ortho-cyano-benzamide with iron, nickel, chromium, lead or manganese in the form of free metal or in the form of oxides, sulfides or carbonates; or by passing ammonia into a melt of phthalic anhydride, phthalamide or phthalimide in the presence of a metal or metal oxide or sulfide.

The coloring matters so obtained have been named generically metal-phthalocyanines, and individually copper-phthalocyanine, iron-phthalocyanine, etc., according to the metal which they contain. A more detailed discussion of their structure is contained in a series of articles by Linstead et al., in the Journal of the Chemical Society for 1934, pages 1016 to 1039.

The processes of the two earlier British patents above mentioned have the advantage of starting with relatively inexpensive initial material. The organic initial material mentioned in these patents is phthalic anhydride, phthalimide, phthalic acid diamide and ortho-cyano-benzamide, the corresponding derivatives of naphthalene and anthracene, or nuclear substitution derivatives of these compounds. These processes, however, do not give such good yields and such high quality products as that of the subsequent process of British Patent No. 410,814, wherein an ortho-arylene-dicyanide is employed. The latter, however, has the disadvantage that the initial material is relatively more expensive, and has to be specially synthesized from the initial material first mentioned.

The present invention relates to a process for the manufacture of the copper phthalocyanines in good yield from starting materials different from those hitherto used and easily accessible, or in improved yield when known starting materials are used.

I have found that when an ammonium phthalate is heated with substances yielding copper, (i. e. the metal itself or salts thereof, e. g. halides or acetates) and with an amino-sulphonic acid or a salt thereof, then copper phthalocyanine is formed in good yield.

Usually the metal is added to the reaction mixture in the form of salts, and the reaction then proceeds smoothly at 220° C. to 260° C. conveniently at 240° C. to 250° C.; when the free metal is used, it is to be in a state of fine division, and a somewhat higher temperature is needed.

The process appears to involve a dehydration, and agreeably to this interpretation there may be used instead of an ammonium phthalate another derivative of the corresponding phthalic acid. Thus the phthalic diamides, or the salts of the phthalamic acids or the o-cyanobenzoic acids, or the o-cyanobenzamides may be used. Also, as the ammonium phthalates may be formed in situ, it is possible to use a phthalimide or a phthalic anhydride or a free phthalic acid, sufficient ammonia being of course provided, as by use of another ammonium salt. In this repect the invention may be regarded as an improvement on that described in British Specification No. 322,169, the improvement being that the process is technically more feasible and in particular that higher yields are obtained. The same may be said when cyanobenzamides are used (Compare British Specification No. 389,842).

The term "ammonium salt of an amino-sulfonic acid" is intended to include the ammonium salts of amino-mono-sulfonic acid ("sulfamic acid"), amino-disulfonic acid ("imino disulfonic acid") and amino-trisulfonic acid ("nitrilo-sulfonic acid"). See Inorganic Chemistry, Ephraim, trans. Thorne, London and Edinburgh, 1926, page 540.

More particularly, I select as initial material phthalic acid or a salt thereof, for instance ammonium phthalate or one of the compounds obtainable at least theoretically in the successive dehydration and deamidation of ammonium phthalate, for instance phthalamic acid, ammonium phthalamate, phthalic anhydride, phthalic acid diamide (phthalamide), phthalimide, or ortho-cyano-benzamide. In lieu of the above particular compounds, their nuclear substitution derivatives may be employed, for instance mono- or di-halogen, mono- or di-nitro compounds, sulfonic acid derivatives and others. Also, in lieu of the mentioned compounds of the phthalic acid family, the corresponding derivatives from naphthalene- or anthracene-ortho-dicarboxylic acids may be employed. More specifically, 4-chlorophthalic anhydride, and 3- and 4-nitrophthalic anhydrides or other corresponding derivatives of the respective acids may be mentioned. The sulphophthalic acids are likewise adapted to serve as starting materials, and give characteristic products, soluble in water.

The said initial material is mixed with a salt of one of the metals above mentioned, for instance cuprous or cupric chloride, cuprous or cupric acetate, ferric chloride, nickel chloride, or the corresponding amino-sulfonates.

To these is added the ammonium salt of an amino-sulfonic acid, for instance ammonium sulfamate. Since the presence of ammonium compounds is necessary for the reaction where the initial material does not contain two nitrogen atoms per ortho-arylene radical, it is preferable to select the said amino-sulfonic acids in the form of their corresponding ammonium compounds. Alternatively, one may use the free acids jointly with ammonium salts, gaseous ammonia, or other re-agents adapted to furnish ammonia in the heated reaction mass.

Without limiting my invention to any particular procedure, the following examples are given to illustrate my preferred mode of operation. Parts mentioned are by weight.

*Example 1.*—7 parts of ammonium phthalate, $C_6H_4(COONH_4)_2$, 7 parts of ammonium aminosulfonate and 2 parts of copper acetate are well mixed and heated. The mixture becomes partly fluid at about 220° C. and blue at about 240° C. It is kept at 240 to 250° C. until formation of coloring matter is complete. The mixture is cooled, ground, boiled with water and filtered. The solid matter is dried, dissolved in 10 parts of 94% sulfuric acid, poured into 100 parts of water, filtered, washed free of acid and dried. Copper phthalocyanine is thus obtained in good yield.

*Example 2.*—The process of Example 1 is carried out, but using 1½ parts of anhydrous cupric chloride instead of the copper acetate, the heating being similar and the product being isolated in the same way.

*Example 3.*—7 parts of phthalamide, 6 parts of ammonium amino-sulfonate and 2 parts of cuprous acetate are well mixed and heated at 220 to 240° C. until no more coloring matter is formed. It is isolated as in Example 1 and appears to be the same compound.

*Example 4.*—The process of Example 1 is repeated but using the following materials instead of those previously stated; namely, 8 parts of ammonium phthalamate, 9 parts of ammonium amino-sulfonate and 1½ parts of anhydrous cupric chloride. A copper phthalocyanine is obtained in good yield.

*Example 5.*—33 parts of phthalamide, 46 parts of ammonium amino-sulfonate and 5 parts of anhydrous cuprous chloride are heated at 230° C. and the product is worked up as described in the preceding examples. 11 parts of blue pigment are obtained.

*Example 6.*—6 parts of phthalic anhydride, 6 parts of ammonium chloride, 12 parts of ammonium aminosulfonate and 1.5 parts of anhydrous cupric chloride are heated at 240° C. for 2 hours. The product is isolated as in Example 1. It is a blue coloring matter.

*Example 7.*—66 parts of phthalimide, 90 parts of ammonium amino-sulfonate and 16 parts of anhydrous cupric chloride are mixed and heated for 2 hours at 220° C. The product is isolated as in Example 1. It is a blue coloring matter.

*Example 8.*—33 parts of phthalamide, 45 parts of ammonium amino-sulfonate and 3.8 parts of finely divided copper powder are heated to 280° C. and kept at 280 to 290° C. until no more coloring matter is formed. The product is isolated as in Example 1. It is a blue coloring matter.

In a similar manner other compounds of the above series may be condensed with ammonium amino-sulfonates and cupriferous reagents to give the corresponding copper phthalocyanine. For instance, when 4-sulfo-phthalic acid, ammonium sulfamate and cuprid chloride are reacted together in the proportions indicated in the above examples and at a temperature of about 220° C., a blue, water-soluble coloring matter is obtained, which is presumed to be tetra (4)-sulfo-copper phthalocyanine.

In all the examples, solvents or suspension media may be employed to assist in the manipulation. Suitable media for this purpose are indifferent organic liquids of conveniently high boiling point, for instance naphthalene, beta-methyl-naphthalene or crude chloro-naphthalene.

The copper phthalocyanines are useful pigments, copper phthalocyanine itself being a bright blue substance. For technical purposes pigments must satisfy various demands in which particular physical properties (fineness of division, non-crystalline form, freedom from impurities) are of great importance. The products of the present invention in its preferred embodiments are obtained in such a form that they are excellently suited for use as pigments; the process being such that any excess of reagent is readily removed, and the shades of the pigments being very bright.

Ammonia may be passed through the reaction mass if desired, particularly where the amino-sulfonic acid is initially in the form of free acid.

Other variations and modifications may be made, within the scope of the prior British patents above mentioned, as will be readily apparent to those skilled in the art.

I claim:

1. The process of producing a copper phthalocyanine, which comprises heating an ortho-arylene compound of the group consisting of phthalic acids, phthalic anhydrides and phthalimides with an ammonium amino-sulfonate in the presence of a reagent adapted to furnish copper.

2. The process of producing a copper phthalocyanine which comprises heating a phthalic acid with an ammonium amino-sulfonate in the presence of a reagent adapted to furnish copper.

3. The process of producing a copper phthalocyanine which comprises heating a phthalic anhydride with an ammonium amino-sulfonate in the presence of a reagent adapted to furnish copper.

4. The process of producing a copper phthalocyanine which comprises heating a phthalimide with an ammonium amino-sulfonate in the presence of a reagent adapted to furnish copper.

5. The process of producing a water-soluble coloring matter of the phthalocyanine series, which comprises heating together at a temperature between 220 and 250° C., 4-sulfo-phthalic acid, ammonium aminosulfonate and cupric chloride.

6. The process of producing copper-phthalocyanine, which comprises heating together at a temperature between 220 and 250° C., phthalic anhydride, ammonium amino-sulfonate, ammonium chloride, and cupric chloride.

7. The process of producing copper-phthalocyanine, which comprises heating together at a temperature between 220 and 250° C., phthalimide, ammonium, amino-sulfonate, and cupric chloride.

MAX WYLER.